(12) United States Patent
Loveder

(10) Patent No.: US 8,372,234 B2
(45) Date of Patent: Feb. 12, 2013

(54) INJECTION MOLDED FOOTWEAR AND RELATED METHOD OF MANUFACTURE

(75) Inventor: Christopher J. Loveder, Rockford, MI (US)

(73) Assignee: Wolverine World Wide, Inc., Rockford, MI (US)

( * ) Notice: Subject to any disclaimer, the term of this patent is extended or adjusted under 35 U.S.C. 154(b) by 108 days.

(21) Appl. No.: 13/023,193

(22) Filed: Feb. 8, 2011

(65) Prior Publication Data
US 2012/0199277 A1    Aug. 9, 2012

(51) Int. Cl.
| A43D 86/00 | (2006.01) |
| A43B 3/26  | (2006.01) |
| B29C 65/04 | (2006.01) |
| A43B 9/16  | (2006.01) |

(52) U.S. Cl. ............. 156/245; 156/272.2; 12/4.1; 36/97
(58) Field of Classification Search ......... 36/97; 12/4.1, 12/142 F, 142 P; A43B 3/26, 9/00, 9/16, A43B 9/18, 9/20; A43D 25/00, 86/00
See application file for complete search history.

(56) References Cited

U.S. PATENT DOCUMENTS

| 2,034,091 | A |   | 3/1936  | Dunbar          |
| 2,622,052 | A |   | 12/1952 | Chandler        |
| 3,504,450 | A |   | 4/1970  | Steadman et al. |
| 3,525,165 | A |   | 8/1970  | Randall         |
| 3,650,051 | A |   | 3/1972  | Sass            |
| 4,232,458 | A |   | 11/1980 | Bartels         |
| 4,693,021 | A |   | 9/1987  | Mazzarolo       |
| 4,704,808 | A |   | 11/1987 | Bianchini et al. |
| 4,785,558 | A |   | 11/1988 | Shiomura        |
| 5,437,112 | A |   | 8/1995  | Johnston        |
| 5,449,428 | A | * | 9/1995  | Desmarais et al. ........ 156/274.4 |
| 5,511,323 | A |   | 4/1996  | Dahlgren        |
| 5,647,150 | A | * | 7/1997  | Romanato et al. ........... 36/117.1 |

(Continued)

FOREIGN PATENT DOCUMENTS

| EP | 0342462 | 11/1989 |
| EP | 1230867 | 8/2002  |

(Continued)

OTHER PUBLICATIONS

PCT/US2011/061640 International Search Report, May 31, 2012.

(Continued)

*Primary Examiner* — William Bell
(74) *Attorney, Agent, or Firm* — Warner Norcross & Judd LLP

(57) ABSTRACT

A method of manufacturing footwear includes providing a modular forepart and a modular rearpart, overlapping these parts along an overlap margin a preselected distance, and permanently joining the parts to selectively manufacture footwear of at least two different sizes, for example, a full size or a half size or some other partial size. The forepart and rearpart can be injection molded from one or more polymeric materials in a mold. The polymeric materials can be bonded to a sheet of material which can be at least partially retained in a three-dimensional, contoured shape by the polymeric material. The molded polymeric material can form a supportive and/or structural exoskeleton in an upper portion of the footwear. The exoskeleton can define one or more holes through which the sheet is visible to form one or more aesthetic regions on the upper. An article of footwear constructed with the method is also provided.

24 Claims, 10 Drawing Sheets

U.S. PATENT DOCUMENTS

| | | |
|---|---|---|
| 5,899,006 A * | 5/1999 | Donnadieu ............. 36/97 |
| 6,216,366 B1 | 4/2001 | Donnadieu |
| 6,233,845 B1 | 5/2001 | Belli |
| 6,289,528 B1 * | 9/2001 | Ridder et al. ............. 4/583 |
| 6,299,962 B1 | 10/2001 | Davis et al. |
| 6,533,885 B2 | 3/2003 | Davis et al. |
| 6,539,646 B2 * | 4/2003 | Brooks et al. ............. 36/30 R |
| 7,047,668 B2 | 5/2006 | Burris et al. |
| 2002/0071946 A1 | 6/2002 | Norton et al. |
| 2003/0097770 A1 * | 5/2003 | Karasawa ............. 36/97 |
| 2006/0017195 A1 * | 1/2006 | Yang ............. 264/244 |
| 2006/0107552 A1 | 5/2006 | Clark et al. |
| 2007/0199210 A1 | 8/2007 | Vattes et al. |
| 2007/0245595 A1 | 10/2007 | Chen et al. |
| 2009/0183392 A1 | 7/2009 | Shane |
| 2010/0139122 A1 | 6/2010 | Zanatta |

FOREIGN PATENT DOCUMENTS

| | | |
|---|---|---|
| EP | 1430803 | 6/2004 |
| WO | 2005014268 | 2/2005 |

OTHER PUBLICATIONS

PCT/US2011/061640 Written Opinion, May 31, 2012.

* cited by examiner

INJECTION MOLDED FOOTWEAR AND RELATED METHOD OF MANUFACTURE

BACKGROUND OF THE INVENTION

The present invention relates to footwear, and more particularly, to a method for manufacturing footwear.

Most conventional footwear includes an upper, within which a wearer's foot is positioned, and a sole, which generally forms a ground contacting, wear layer positioned beneath the wearer's foot. The upper and sole are usually separately manufactured, then joined with one another to complete the footwear.

Each footwear model typically is constructed in a wide variety of standard shoe sizes to ensure that the model can be offered to and fit a significant cross section of potential footwear consumers. There are a variety of different sizing systems to characterize "standard" shoe size measurements, for example, the U.S. system, the English system, the Parisian system, the Mondopoint system and the Asian system. Usually, these systems have shoe sizes that are divided into full and partial sizes, for example, under the U.S. system, the standard sizes usually are provided in full sizes, such as 8, 9, 10, etc., as well as half sizes, such as 8½, 9½, 10½, etc., to closely approximate and fit well a wearer's foot.

To make such a wide variety of sizes for a particular footwear model, manufacturers typically have to produce multiple different uppers and multiple different outsoles for each full shoe size and for each corresponding half shoe size. For example, for a single footwear model, a first upper pattern is created for a U.S. size 9½ shoe, and a second upper pattern is created for a U.S. size 9 shoe (along with all other desired sizes). Likewise, a first sole mold is created to mold a sole of proportionate size and shape to the U.S. size 9½ first upper pattern, and a second sole mold is created to mold another, different sole of proportionate size and shape to the U.S. size 9 second upper pattern. Accordingly, two separate lasts typically are used to construct the two different upper patterns, and two separate molds are used to mold the two different outsoles to create the two different sized shoes corresponding to the same footwear model.

The extra set of molds and lasts, and related retooling and operation, for the different soles and uppers can create a significant cost and labor burden on manufacturers. Basically, for each footwear model that has full U.S. shoe sizes 2 through 13 and corresponding half sizes, 2½ through 13½, the manufacturer might invest in, make and dedicate 24 different lasts for uppers and 24 different molds for corresponding soles. Again, this can result in a significant investment just to produce a given footwear model.

Another issue with most footwear is that the upper is constructed from multiple individual pieces of material. Those pieces are cut from stock material and usually modified in thickness for the particular footwear. Then they are joined with one another typically by stitching or cementing to form a three-dimensional upper. The pieces of the upper also are shaped over a last to better define the shape of the upper. After the pieces of the upper are assembled, a liner typically is then joined with them, again with more stitching or gluing. If the footwear is to include laces, eyelets must be formed on the upper.

All of the foregoing steps require substantial labor input. Moreover, the amount of labor required is compounded by the fact that every time a new footwear model and its various shoe sizes are desired, the manufacturing method must be retooled to accommodate the variations. Unfortunately, while many have tried to address the labor intensity issues concerning footwear, they remain as much a problem now as they did at the turn of the century.

Accordingly, there remains much room for improvement to provide a footwear manufacturing method and related footwear that is flexible enough to accommodate multiple models and sizes of footwear, and that generally reduces the amount of labor and time input for manufacturing the footwear.

SUMMARY OF THE INVENTION

A method for manufacturing footwear is provided, where the method includes providing a modular footwear forepart and a modular footwear rearpart, overlapping these parts along an overlap margin a preselected distance, and permanently joining the parts to selectively manufacture footwear of at least two different sizes, for example, a full size or a half size.

In one embodiment, the forepart and rearpart can be injection molded from one or more polymeric materials in a mold. The polymeric materials can be bonded to a base material or piece, which can be retained in a three-dimensional, contoured shape by the polymeric material. Optionally, the three-dimensional shape of the material can be attained during the molding process, with the polymeric material pretensioning the material in its three-dimensional shape, so that the material can further optionally avoid undergoing conventional heat setting processes to attain that three-dimensional shape.

In another embodiment, the molded polymeric material can form a supportive or structural exoskeleton in an upper portion of the footwear. The exoskeleton can define one or more holes through which the base material is visible to form one or more aesthetic regions on the upper.

In still another embodiment, at least one of the forepart and rearpart can include a primary margin, and the other of the forepart and rearpart can include an overlap margin. The overlap margin can be overlapped by the primary margin by a first distance corresponding to a first shoe size, or a second distance corresponding to a second shoe size different from the first shoe size—for example, U.S. full and half sizes of the same general size, such as size 9 and a size 9½, or any other full and partial sizes of the U.S., or any other shoe size system.

In yet another embodiment, either the first shoe size or the second shoe size can be selected in a manufacturing process to be the size of the footwear. A modular forepart and a modular rearpart, which can accommodate either the first shoe size or the second shoe size, can be aligned and selectively overlapped along the overlap margin and the primary margin by either the first distance or the second distance based on the selection. These margins can be joined to permanently and fixedly join the modular forepart and the modular rearpart along a joint. With the ability to accommodate different shoe sizes with the same modular forepart and modular rearparts, an operator can switch back and forth between making footwear having the first shoe size and footwear having the second shoe size minimized labor and resource investment.

In even another embodiment, the method can include taking a two-dimensional base material or piece, placing it in a mold corresponding to at least one of the forepart and rearpart, conforming the piece to the three-dimensional contours of the mold, and molding a polymeric material on the piece in preselected locations and/or in a preselected pattern so that the polymeric material bonds to the piece and forms a structural exoskeleton. The polymeric material can assist in conforming the piece to the three-dimensional contours of the mold by pretensioning the piece and/or retaining the piece in a three-dimensional form after molding in the finished footwear.

In still yet another embodiment, the exoskeleton can define one or more holes through which the base material and/or piece is visible to form one or more aesthetic regions on the upper. With these aesthetic regions, the upper surface of the base material can be readily visible to a viewer of the footwear. Certain colors, designs, indicia, textures, text or other readily perceptible features can be included within the aesthetic region.

In still even a further embodiment, the exoskeleton and base material and/or piece can form an upper portion of a forepart or rearpart of the footwear. To the upper portion, a sole portion can be joined. For example, the forepart upper portion can be joined with a forepart sole portion to form a combined forepart. Separate and independently from this combined forepart, a combined rearpart can be formed by joining a rearpart upper portion with a rearpart sole portion.

In still yet even another embodiment, the combined forepart and the combined rearpart can be joined along a joint at the primary margin and overlap margin via RF welding, HF welding, sonic welding, stitching, gluing and/or fastening with fasteners to complete the footwear.

In a further embodiment, the upper portion and sole portion can be joined by injection molding the upper portion, with its exoskeleton and base material and/or piece forming portions thereof, and injection molding the sole portion to the upper portion. This can be repeated for the modular forepart and modular rearpart of the footwear, respectively, before these components are assembled, and then these components can be joined.

The footwear and related method of manufacture described herein can provide a modular construction that can be used to make varying sizes of footwear models, optionally without duplicating upper patterns and/or corresponding molds for the corresponding outsoles among closely-sized shoes. The method of constructing the footwear can be reduced to a handful of steps, not including lacing or adding additional liners or foot beds where desired. This can reduce labor and the amount of time to construct the footwear. Where the upper portion and sole portion of either or both of the forepart and rearpart are injection molded, then joined, the amount of time and labor to construct the footwear can be further reduced. In addition, with the current methods, a variety of designs and different configurations of the upper and outsole of footwear can be realized.

Further, with the simplicity and efficiency of the present method, retooling costs and retooling time for different footwear models can be reduced. As a result, multiple footwear models and their respective shoe sizes can be easily accommodated. In some cases, the number of molds used to make footwear models can be reduced by half or more, which can provide improved cost savings. Moreover, with the above mentioned reduction in labor and processing, the present footwear and method lend themselves well to small, micromanufacturing facilities with a low number of operators generating a high volume of footwear.

These and other objects, advantages and features of the invention will be more readily understood and appreciated by reference to the detailed description of the embodiments and the drawings.

DETAILED DESCRIPTION OF THE CURRENT EMBODIMENTS

I. Overview

Figure 1:
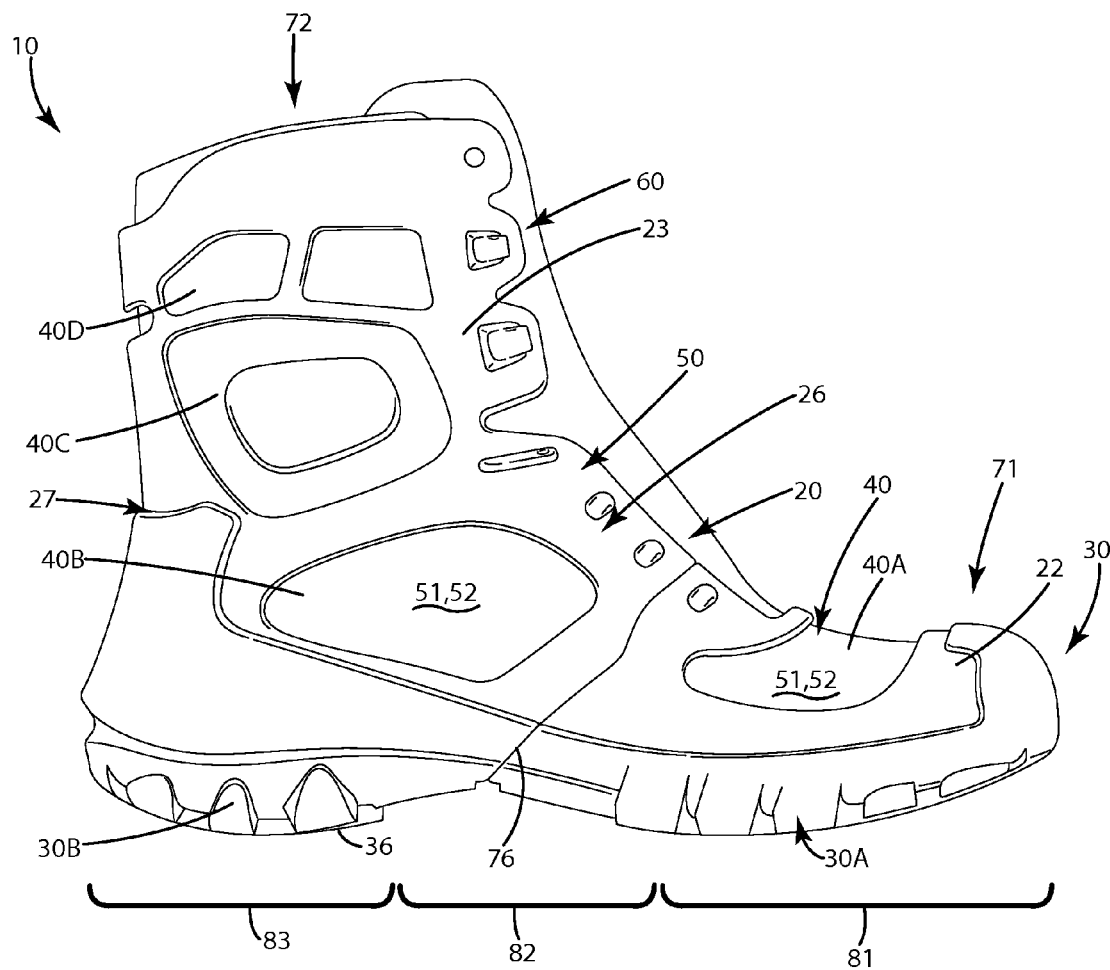
FIG. 1 is a side view of a current embodiment of the footwear.

A current embodiment of the footwear shown in FIGS. 1-4 and generally designated 10. The footwear 10 can include an upper 20 joined with a sole 30. The upper 20 can be constructed from multiple pieces 40A-40D of base material 40 and an exoskeleton 50. The exoskeleton 50 can be bonded to the base material as described below. The exoskeleton can define one or more apertures 51 through which the base material is visible and forms one or more aesthetic regions 52. The entire upper, excluding any ancillary features, and optionally the outsole, can be formed and joined together by the exoskeleton 50 and can optionally be substantially, if not entirely, void of a stitching. In turn, this can provide a more easily manufactured, less labor intensive construction. Of course, if certain stitching or ancillary elements are desired as noted below, they may be included in the construction.

In general, a method for manufacturing the footwear is shown in FIGS. 3-8. There, the base material 40, and in particular, its different pieces 40A-40D are placed in respective molds 101 and 105 and generally transformed from two-dimensional flat pieces to three-dimensional contoured pieces conforming to the mold and/or the finished footwear. During the injection molding process, a polymeric material is injected into the molds to pretension, bend or generally conform the pieces to the shape of the finished footwear. The polymeric material can be injection molded at a mold pressure and can form the exoskeleton 50. The exoskeleton 50, and more particularly the polymeric material from which it is constructed, embeds within the base material pieces 40A-40D thereby bonding the exoskeleton to those pieces. The base material pieces and the exoskeleton, and any additional layers, can form substantially all the upper, optionally without having to perform any additional stitching operations to join other major components to the upper. Further, the upper portions of 20A and 20B can be formed in respective three-dimensional contours of the molds to form the respective three-dimensional upper portions 20A and 20B of the respective forepart 71 and rearpart 72. The forepart sole portion 30A and rearpart sole portion 30B can be joined, optionally by injection molding, with the forepart upper portion 20A and rearpart upper portion 40A, respectively, to form modular combined forepart 71 and modular combined rearpart 72, respectively.

Figure 2:
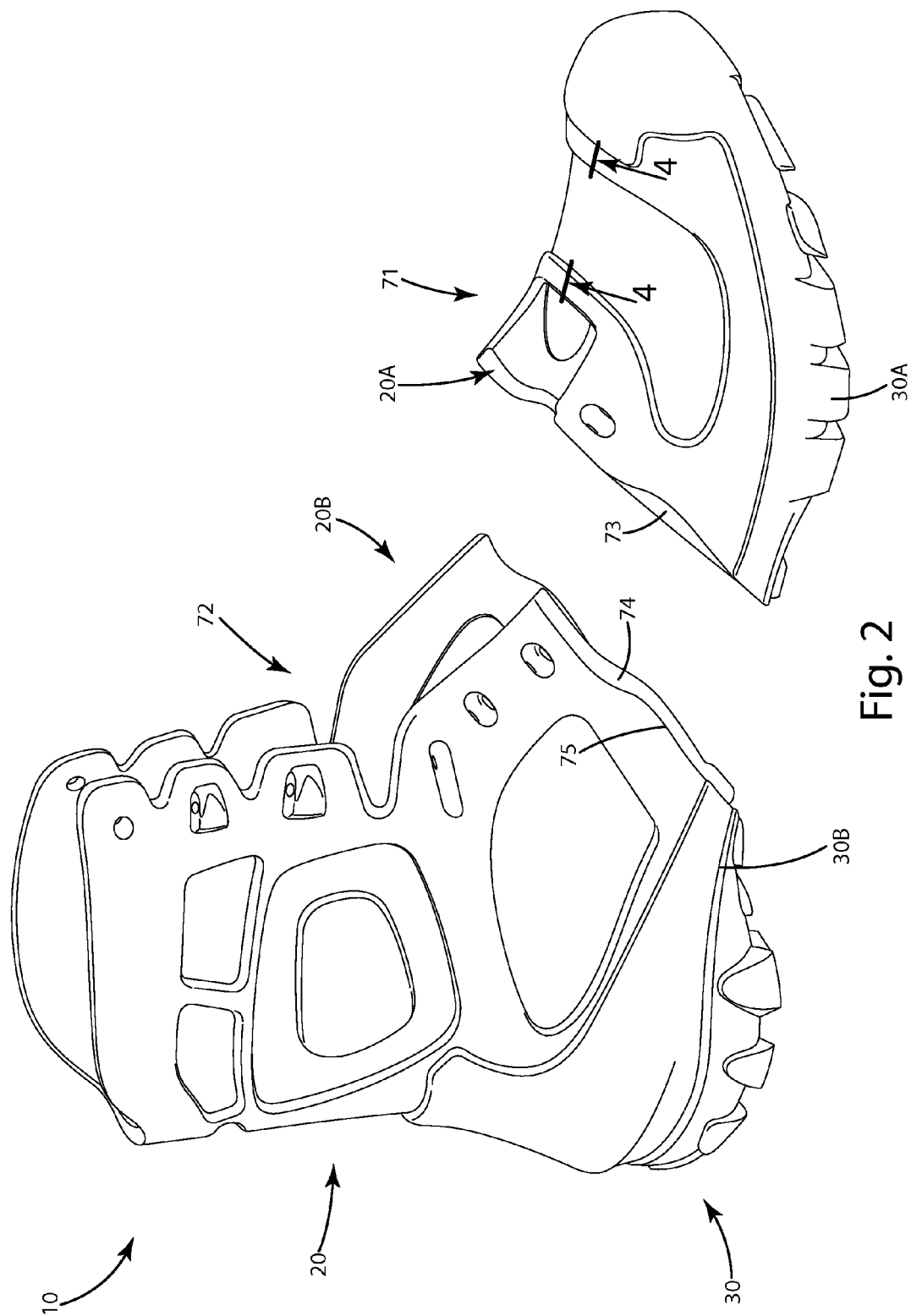
FIG. 2 is a perspective view of the footwear illustrating a forepart and a rearpart before joining.
Figure 3:
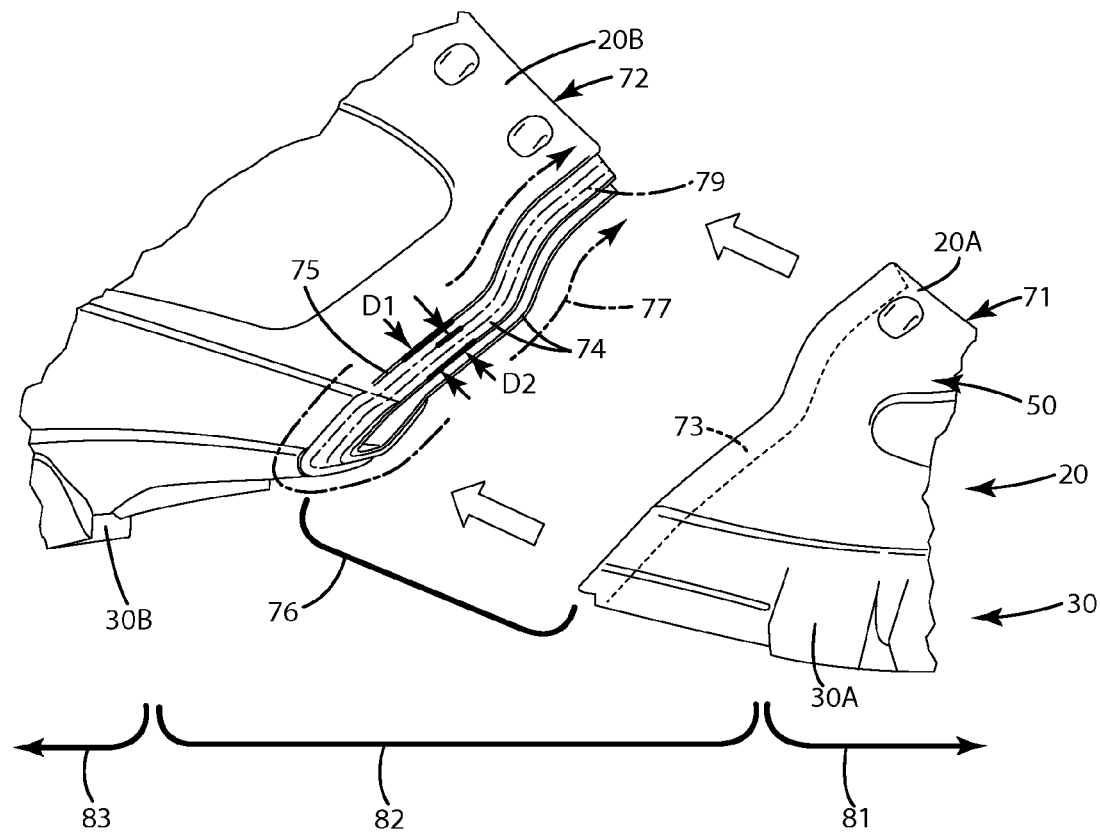
FIG. 3 is a close up view of the forepart and rearpart being joined.

As shown in FIGS. 2-3, after the respective modular combined forepart 71 and modular combined rearpart 72 are separately and independently constructed, these elements can be overlapped a preselected distance and joined along a joint 76 which can include a primary margin 73 and an overlap margin 74. The preselected distance can be at least one of a first distance D1 corresponding to a first shoe size and a second distance D2 corresponding to a second shoe size. The preselected distances D1 and D2 are different from one another. For example, distance D1 can correspond to a half shoe size and distance D2 can correspond to a full shoe size. As a further example, when the overlap margin 74 and primary margin 73 overlaps the distance D1, the footwear can be a conventional U.S. size 9. In contrast, when the overlap margin 74 and primary margin 73 overlap the distance D2, the shoe size can be a conventional U.S. size 9½. Of course, any full or half or other partial shoe sizes of any conventional sizing systems, such as the English, Asian, Parisian and Mondopoint systems, can be incorporated into the footwear and respective margins and joint. Optionally, the overlap margin 74 and primary margin 73 can be of significantly greater lengths than that shown in the current embodiment. In such an alternative configuration, the margins can overlap one another a variety of distances, for example, 3, 4, 5, 6 or more or less distances, corresponding to multiple different full, half, or other partial or custom shoe sizes.

With the construction of the current embodiments herein, the modular combined forepart 71 and modular combined rearpart 72 can be selectively joined with one another to accommodate a variety of shoe sizes. Accordingly, separate upper molds and/or sole molds optionally are not duplicated for full and half sizes, or other combination of shoe sizes, depending on the application.

For purposes of disclosure, the embodiments herein are described in connection with a boot construction. As will be appreciated, the embodiments are also well suited for other types of footwear including but limited to athletic footwear, sandals, fitness footwear, casual footwear, work footwear, outdoor footwear, walking footwear and multi-sport footwear.

Further, as used herein, the term "arch region" (or arch portion) refers generally to the portion of the footwear corresponding to the arch of the wearer's foot; the term "forefoot region" (or forefoot portion) refers generally to the portion of the footwear forward of the arch region corresponding to the forefoot (e.g., including the ball and the toes) of a wearer's foot; and the term "heel region" (or heel portion) refers generally to that portion of the footwear rearward of the arch region corresponding to the heel of the wearer's foot. The forefoot region 81, arch region 82 and heel region 83 are generally identified in FIG. 1, however, it is to be understood that delineation of these regions may vary depending upon the configuration of the footwear.

II. Structure

The components of the footwear 10 will now be described in more detail. As shown in FIG. 1, the upper 20 can include multiple conventional structures which will not be described in detail here. Suffice to say that the upper can include a toe box 22, an ankle support 23, one or more quarters 26, and a heel counter 27.

Each of the above upper components, which collectively make up the upper 20 of the current embodiment, can be at least partially formed by both the exoskeleton 50 and the base material 40, which as explained below includes multiple independent base pieces 40A-40D that are generally conformed from a two-dimensional configuration to a three-dimensional contoured configuration in the molding process and optionally held in that three-dimensional configuration by the exoskeleton if desired.

For example, the toe box 22 can be formed by part of the exoskeleton 50 extending over and supporting a base material piece 40A adjacent the toe box 22. Optionally, the base material piece 40A can terminate adjacent the toe box so that it does not extend beyond the modular combined forepart 71, to other portions of the base material 40 in the modular combined rearpart 72. Further optionally, the pieces 40B-40D likewise can be located substantially within the modular combined rearpart 72 without extending into the modular combined forepart 71. The exoskeleton 50 can form holes through which the base material 40, and particular portions of the base material piece 40A, is visible to form one or more aesthetic regions 52 in the toe box. Similarly, the quarter 26 can be formed from both the exoskeleton 50 and the underlying base material 40 and more particularly the underlying base material piece 40B. Other components can be similarly constructed from combinations of the exoskeleton 50 and respective base material pieces, for example, base material pieces 40C and 40D. Further, although the pieces 40A-40D are shown in a particular layout, their shape, size and location can vary depending on the particular footwear application and desired aesthetic or functional features of the footwear.

The exoskeleton 50 can provide structural support to the footwear in preselected locations, and also can operate to hold the respective base material pieces 40A-40D in a three-dimensional or other configuration in the finished footwear. For example, due to the rigidity polymeric material from which the exoskeleton 50 is constructed, the exoskeleton 50 can physically and structurally support the base material piece 40A in the three-dimensional configuration shown in the figures. Optionally, without the exoskeleton holding it is place, that particular base material piece 40A would generally return to a two-dimensional, or flat, or planar configuration, assuming it had not been heat set or otherwise molded in a pre-determined three-dimensional configuration.

Optionally, in certain types of footwear, certain elements of the boot components noted above can be absent. For example, in a sandal construction, the extended ankle support 23, heel counter 27 and toe box 22 can be absent.

Returning to FIGS. 1-4, the base material 40 can be divided up into multiple independent pieces 40A, 40B, 40C and 40D. These pieces can be distributed throughout one or both of the respective forepart 71 and rearpart 72. The base material 40 and the respective pieces can optionally provide added functionality to the footwear 10. For example, in some circumstances, the base material 40 can be constructed from a breathable fabric, which can allow a wearer's foot in the footwear 10, to be exposed to circulating air. In some cases, this can be helpful where the exoskeleton 50 is constructed entirely from a non-breathable, nonporous material, such as a thermoplastic material, or a liquid silicone rubber molded part, which generally does not breath or provide air circulation.

The base material 40 optionally can be constructed in the form of a membrane, for example, as a waterproof membrane, a semi-porous membrane and/or a semi-breathable membrane. Further, depending on the application, the individual pieces of the base material 40 can be positioned strategically throughout the footwear to provide increased flexibility in the selected areas of the footwear 10. Alternatively, where a particular rigidity is desired in certain regions, and the exoskeleton 50 is constructed from a slightly less rigid material, the base material pieces 40A-40D can be constructed to be semi-rigid, rigid and/or inflexible. Such pieces can be strategically placed in certain areas of the exoskeleton to make the footwear selectively rigid. In such cases, those pieces can be heat set or otherwise molded or shaped in that semi-rigid or rigid configuration.

Figure 4:
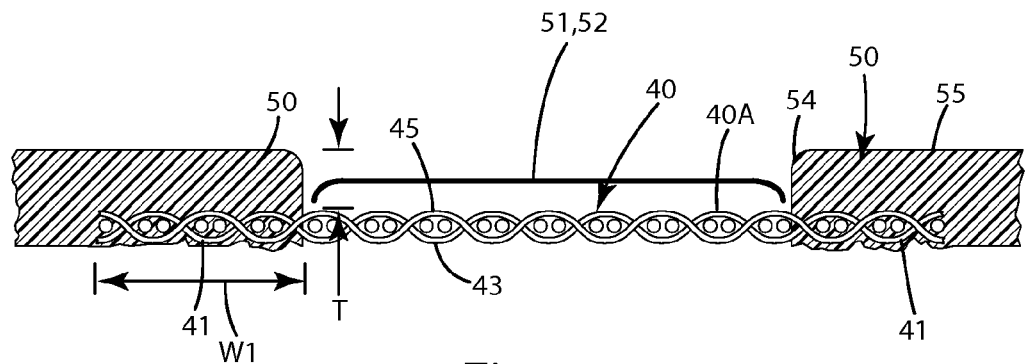
FIG. 4 is a close up section view illustrating a base material piece and an exoskeleton of the footwear.

The base material 40, and generally, one or more of the individual base material pieces 40A-40D, can be constructed from a variety of synthetic, natural or combination of natural and synthetic materials. For example, the material can be woven or non-woven textiles including fibers and/or filaments, a mesh construction, a membrane construction—for example, a water-resistant or waterproof membrane such as Gore-Tex® or Sympatex®, natural or synthetic leathers, and the like, in combinations of the foregoing and similar materials. For example, as shown in FIG. 4, the base material 40, for example, the piece 40A can include a woven material including interwoven fibers. The piece can be constructed so that the exoskeleton embeds in and bonds well to the particular base material that is shown in FIG. 4 and described in further detail below.

Returning to FIGS. 4-6, the footwear 10 can include a sole 30 joined with the upper 20. The sole can include a midsole and outsole, although not shown in the figures. The midsole could be constructed from a cushioning material such as ethyl vinyl acetate or a different durometer thermoplastic material than the remaining portion of the sole 30. The midsole and outsole can extend optionally through the forefoot 81, arch 82, and heel 83 regions. The outsole, or lower ground contacting portion of the sole 30 can be manufactured from a relatively hard thermoplastic material, hard rubber or other sufficiently durable or wear-resistant material. The bottom of the sole 30 can include an outer surface 36 that forms the wearing surface of the outsole and can be contoured in a desired pattern. The outer surface 36 can be textured and/or can include lugs to provide traction at the heel and the forefoot, if desired, or can be compartmentalized to include specific tread patterns in certain regions of the footwear.

The exoskeleton 50, its construction, and its association with the base material 40 and in particular the individual base material pieces 40A-40D will now be described in more detail. As shown in FIGS. 1-4, the exoskeleton 50 can define multiple holes, also referred to as apertures 51. These apertures 51 are generally bounded around their edges by a portion of the exoskeleton 50. Within these apertures, the base material 40, and generally the upper surface 45 of the respective pieces of base material 40, are exposed and fully visible. Within the apertures 51 of the exoskeleton 50, the exoskeleton is generally absent from the base material 40 of the respective pieces, and does not cover those respective pieces in those regions.

These regions accordingly can form one or more aesthetic regions in the finished footwear by virtue of the base material being visible through the holes 51 defined in the exoskeleton 50. By aesthetic region, it is meant that the base material 40 is perceptively different from the exoskeleton 50 in some manner. For example, the base material 40 and the aesthetic region 52 could be of a notably different material from the exoskeleton and/or can be a different color, texture, shade, hue, reflectivity, transparency, translucency, and/or other property, from the surrounding exoskeleton 50. In some cases, the aesthetic regions 52 can include indicia, such as text, images, and/or combinations of different materials to provide a visual effect. Generally, these aesthetic regions 52 and the corresponding holes 51 can be an area of optionally at least about one square centimeter, further optionally, at least two square centimeters, even further optionally at least five square centimeters, and yet further optionally at least ten square centimeters or more in size.

As shown in FIG. 1, the holes 51 and aesthetic regions 52 can vary in size and shape. For example, some can be generally small, while others can be generally large in size. The holes 51 and the respective aesthetic regions 52 can be of a variety of geometric shapes. For example, they can be irregular shapes or defined geometric shapes, such as full or partial triangles, squares, rectangles, circles, ellipses, pentagons, hexagons or other shapes depending on the application.

Around the periphery of the aesthetic regions 52, as shown in FIG. 4, and more generally the holes 51, the exoskeleton can project upwardly and away from the upper surface 45 of the base material 40. The exoskeleton can project upwardly and generally extend above the upper surface 45 for a predetermined thickness T. This thickness T can range from optionally at least about 0.1 millimeters to about 10.0 millimeters, further optionally about 0.5 millimeters to about 7.0 millimeters, and even further optionally about 4.0 millimeters. Further, the thickness T of the exoskeleton 50 can vary from region to region and/or component to component and/or forepart to rearpart of the footwear. For example, in areas of high wear near the toe, the thickness T can be greater than the thicknesses in other portions of the footwear, for example, along the quarters 26 or regions above the forefoot. The independent components of the exoskeleton can have a cross section of a variety of geometric shapes, for example, fully or partially triangular, rectangular, square, semi-circular, trapezoidal or of other shapes. Further, the upper edges 54 of the exoskeleton which transition from the outer surface 55 can be curved, chamfered and/or angled depending on the application.

The exoskeleton 50 can be constructed from a variety of polymeric materials, for example, thermoplastic polymers, thermoplastic polyurethane (TPU), ethyl vinyl acetate (EVA), polymer foams, such as polyurethane or ethyl vinyl acetate, polyvinyl chloride, polyurethanes, silicones, rubbers, combinations of the foregoing, and the like. In the current embodiment, however, the exoskeleton 50 can be formed from a liquid silicone rubber (LSR). LSR is a high purity platinum cured silicone with a low compression set, good stability and has the ability to resist extreme temperatures of heat and cold. LSR utilized can be from a family of thermoset elastomers that have a backbone of alternating silicone and oxygen atoms and methyl, or vinyl side groups. Optionally, in some embodiments, the exoskeleton can be constructed from a blend of LSR and a thermoplastic urethane (TPU) or other thermal plastic rubber (TPR).

When constructed from LSR, the current embodiment of the footwear 10 can be injection molded to form the exoskeleton at relatively low temperatures and low pressures. For example, in the molding process described below, the temperatures are optionally between 40° C. and 220° C. and further optionally between 80° C. and 160° C.; and the pressures are optionally between 10 psi and 120 psi, further optionally between 15 psi and 80 psi. This can result in less energy consumption and a more sustainable, energy efficient footwear.

As shown in FIG. 4, the exoskeleton 50 bonds to and embeds at least partially within the base material 40 in a relatively sturdy, permanent manner, and in particular, around the edges 41 of individual pieces 40A-40D. For example, as shown the polymeric material that forms the exoskeleton 50 bonds in a structural manner to the upper surface 45 of the base material 40. The polymeric material embeds itself within the actual base material generally permeating the upper surface 45 and optionally the lower surface 43 thereof, extending around the filaments and/or fibers or other elements from which the base material 40 is constructed at or near the upper surface and optionally, in some cases, deeper into the base material or even further optionally, through the base material. This embedding of the polymeric material can enhance the physical and optionally chemical bond between the exoskeleton and the base material 40 and respective pieces 40A-40D. Further, the polymeric material can be selected so that it generally adheres directly to the outer surfaces of each of the individual filaments and/or fibers or the material from which the base material 40 is constructed.

As shown in FIG. 4, the exoskeleton 50 can be bonded to an outer edge 41 of the individual pieces 40A-40D at a preselected width W1. This width can range from about 1 to about 40 millimeters, 5 to about 30 millimeters, and further optionally about 8 to about 12 millimeters, or any other distance depending on the application, the materials, and the desired aesthetic or functional properties. Within the width W1 of the edge 41, the material can bleed through and embed within the base material 40. In some cases, the edges 41 can be perforated with holes to provide a further structural and physical connection of the exoskeleton 50 and the pieces 40A-40D.

Optionally, if desired, the exoskeleton 50 can include multiple layers of the particular polymeric material. This can be accomplished by molding a first polymeric material and a first shot; then molding another additional layer via a second shot. The additional layers can be selectively located in regions of the upper where additional structural reinforcement of the exoskeleton and/or base material is desired.

If desired, the base material piece 40A can extend substantially around the forefoot of the footwear. Indeed, that piece 40A can be constructed from a three-dimensional bootie portion that is placed on a last with the exoskeleton molded over it. Optionally the bootie and exoskeleton can extend throughout the upper portion 120A of the forepart 71. Likewise, the multiple pieces 40B-40D in the rearpart 72 can be combined into a single piece or replaced with a second bootie portion. In such a construction, the bootie portion and exoskeleton can extend generally throughout the upper portion 120B of the rearpart 72.

Other constructions are contemplated where an exoskeleton is of a generally continuous structure, without holes 51 and corresponding aesthetic regions 52. In such a construction, the exoskeleton can be contiguous and molded over respective forepart and rearpart bootie portions. The bootie portions can be positioned adjacent one another at the joint 76 of the boot 10. Where the joint securely joins the forepart and the rearpart, for example, by an RF weld or other waterproof or water-resistant seam processing, the bootie portions and exoskeleton can generally form a waterproof and/or water-resistant upper.

The footwear of the current embodiment as shown in FIGS. 1-3 can be constructed to include a modular combined forepart 71 and a modular combined rearpart 72. The modular combined forepart 71 can include an upper portion 20A and a sole portion 30A, while the modular combined rearpart 72 can include an upper portion 20B and a sole portion 30B. Generally, each of the upper portions can be joined with the respective sole portions via injection molding techniques. Of course, other techniques such as RF welding, HF welding, sonic welding, stitching, cementing, gluing, or fastening with rivets, staples, and the like, can be used to join these components. As used herein, RF welding refers to radio frequency welding, high frequency welding, and/or sonic welding, or any similar type of welding technique.

The modular combined forepart 71 and modular combined rearpart 72 can be joined at a joint 76. The precise construction of the joint can be dictated by the desired shoe size of the footwear. For example, as shown in FIG. 3, the rearpart 72 can include an overlap portion 74. This overlap portion 74 can be adapted to be placed adjacent and bonded directly to a primary margin 73. The overlap margin 74 and primary margin 73 can be overlapped a preselected distance corresponding to a desired shoe size of the resulting footwear. For example, the primary margin 73 can overlap the overlap margin 74 a preselected distance D2 or a preselected distance D1. These distances can be preselected based on the desired size of the footwear. If the overlap of the primary margin 73 on the overlap margin 74 is distance D2, then the footwear 10 can be constructed to be of a first shoe size, such as a half or partial shoe size. In contrast, if the overlap of the overlap margin 74 by the primary margin 73 is distance D1, then the overall length of the footwear can be reduced so that the second shoe size is less than the first shoe size. Optionally, the second shoe size can be the next-lower full shoe size and, again, can correspond to the first preselected distance D1. Again if overlapped, the preselected distance D2, the shoe size can be the next larger half or partial size.

Although the preselected distances D1 and D2 differ, it is possible to implement a uniform preselected distance of overlap by trimming one or both of the overlap margin 74 and the primary margin 73. For example, if it is desired that the total overlap of the overlap region 74 by the primary margin 73 is distance D2, regardless of shoe size, the overlap margin 74 can be trimmed so that it projects from the trim edge 75 the same amount as distance D2. Thus, when the primary margin 73 overlaps the overlap margin 74, it overlaps only the distance D2 from the edge 75, even though the footwear size is effectively the smaller full shoe size.

Although shown with the overlap margin 74 associated with the modular combined rearpart 72, the overlap margin 74 and primary margin 73 can be exchanged from the respective rearpart and forepart. Alternatively, the forepart 71 and rearpart 72 can include alternating primary margins and overlap margins so that the respective margins interlock with one another. The overlap margin 74 and primary margin 73 are shown as being incorporated primarily in the exoskeleton 50 of the upper portions 20A and 20B. If desired, the overlap margin 74 and primary margin 73 can also or alternatively be incorporated into the sole portions 30A and 30B.

The overlap margin 74 and primary margin 73, after being overlapped the preselected distance, can be joined along the joint 76. This joining can be performed via RF welding, stitching, cementing, gluing, or fastening with rivets, staples, and the like. Generally, the joint can extend substantially about a girth 77 of the footwear. When joined, the forepart upper portion 20A and rearpart upper portion 20B form the combined upper 20. Likewise, when the forepart sole portion 30A and the rearpart sole portion 30B are joined, they form a combined sole 30.

When the overlap margin and the primary margin are joined at the joint 76 in the current embodiment, these elements can be permanently and fixedly joined along that joint. In turn, this permanently and fixedly joins the forepart 71 and rearpart 72. By permanently and fixedly joined, it is meant that the elements are joined so that they cannot be detached or unjoined without at least partially or fully destroying one or both components or the shoe in general.

As shown in FIG. 3, the girth 77 can extend down one side of the upper, across the sole 30, and up the opposite side of the upper 20. With this type of construction, the modular combined forepart 71 and modular combined rearpart 72 are joined with one another along the joint. Of course, the joint can be interrupted with holes or apertures in the respective overlap margin 74 and/or primary margin 73, with the combined forepart and combined rearpart still being considered joined with one another along the joint.

Although shown with the joint 76 and respective overlap margin 74 and primary margin 73 being located generally in the arch region 82, the joint 76 can be located in the forepart region 81 and/or the heel region 83 or combinations of the foregoing, with the joint 76 overlapping one or more regions as desired. Further, the respective primary margin and overlap margin can be constructed to be more curvilinear and can include more projections than that as shown. For example, if desired, the overlap portion 74 can project in a dovetail configuration (not shown) rearwardly toward the heel portion in the sole portion of the footwear. To enable the primary portion to be joined with that rearwardly projecting portion, the forepart sole portion 30A can include a corresponding projection that extends rearwardly so that it the primary margin 73 can overlap the overlap margin 74.

If desired the joint 76 can include a concealment portion 75, which as shown, is generally in the form of a trim edge that is raised relative to the overlap portion 74. This concealment portion 75 can form a cleaner transition between the exterior surfaces of the exoskeleton 50 between the forepart 71 and the rearpart 72. The precise thickness of the trim edge 75 extending above the overlap margin 74 can be similar to that of the thickness of the primary margin 73 to ensure that the outer surfaces of the exoskeleton 50 across the joint are generally on the same level. In certain circumstances where the preselected distance D2 corresponds to the larger shoe size, a portion of the overlap margin 74 can remain exposed and visible. Where, however, the preselected distance is D1, the primary margin 73 can completely conceal the full depth of the overlap margin 74 and abut against the trim edge 75.

Generally, at the joint 76, the amount of overlap of the overlap margin 74 by the primary margin 73 can range from about 1 millimeter to about 50 millimeters, further optionally, about 5 millimeters to about 25 millimeters, and even further optionally about 10 millimeters to about 20 millimeters. Further optionally, to accommodate to certain conventional U.S., or English half footwear sizes, the overlap at the joint, for example, D1, can be about 12 to about 15 millimeters, whereas the amount of overlap D2 to accommodate half sizes can be about 12 to about 18 millimeters. Of course, other amounts of overlap and preselected distances can be used depending on the application, the shoe size, and the sizing system desired.

In the embodiment shown, the modular combined forepart 71 optionally can generally terminate short of the heel region 83 and extend through at least a portion of the forefoot region 81 and arch regions 82. Likewise, the modular combined rearpart 72 can extend in the heel region 83 and at least a portion of the arch region 82, but can terminate short of the forefoot region 81.

If desired, each of the upper portions 20A and 20B of the combined upper portion 20, and even the joint 76 can be substantially free from stitching if it is desired to make a substantially stitching-free upper 20. Of course, these components can be substantially free from stitching even if a bootie or hang-tab label or other small incidental and ancillary component is stitched to or added to the upper 20, provided it does not form a substantial component of the upper.

Although not shown, the footwear 10 can include a steel toe and/or a shank. The steel toe optionally can be embedded in and encapsulated within the exoskeleton 50, the upper forepart portion 20A, and/or the forepart sole portion 30A. Alternatively, the steel toe can be encapsulated between the forepart upper portion 20A and the forepart sole portion 30A. Generally, the steel toe can be held in place by molding these components around at least a portion of the steel toe.

Where included, the shank (not shown) can optionally be encapsulated in or bonded to the sole 30 and/or exoskeleton 50. For example, a shank can be molded directly between the exoskeleton in the rearpart upper portion 20B and the rearpart sole portion 30B, and generally locked in place there between. Alternatively, the shank can be molded directly entirely within the exoskeleton or the rearpart sole portion 30B. If desired, the forepart portion 71 can include a slot or a hole into which the shank interfits for an added level of mechanical joining between the forepart 71 and the rearpart 72. Alternatively, the shank can be included between the respective elements in the modular combined forepart 71 and optionally inserted into a slot defined by the modular combined rearpart 72. The shank can be constructed from metal, composites, rigid polymeric materials, or combinations of the foregoing.

The footwear 10 also can include a bootie 60 that is inserted in the cavity enclosed by the upper 20, and can generally cover most or all of the foot. The bootie 60 can be constructed from a water-proof or water-resistant, but air permeable or breathable material. Optionally, the bootie can be constructed from neoprene, rubber, silicone, fabrics, membranes such as Gore-Tex® or Sympatex®, natural or synthetic materials or composites, combinations of the foregoing and the like. If desired, an optional footbed (not shown) can be inserted between the bootie 60 and the sole 30 within the cavity of the upper 20. To assist in securing the footwear on a wearer's foot, lacing 63 can be laced across a portion of the upper through a lacing system defined by the exoskeleton or by lacelets or eyelets joined with the exoskeleton and more generally the upper 20.

III. Method of Manufacture and Assembly

A method of manufacture and assembly of the footwear 10 will now be described with reference to FIGS. 4-8. In general, to manufacture and assemble footwear 10, the respective modular combined forepart 71 and modular combined rearpart 72 are constructed separately and independently from one another, in one or more injection molding operations, and then joined with one another at an overlap margin and/or a primary margin along a joint 76.

Figure 5:
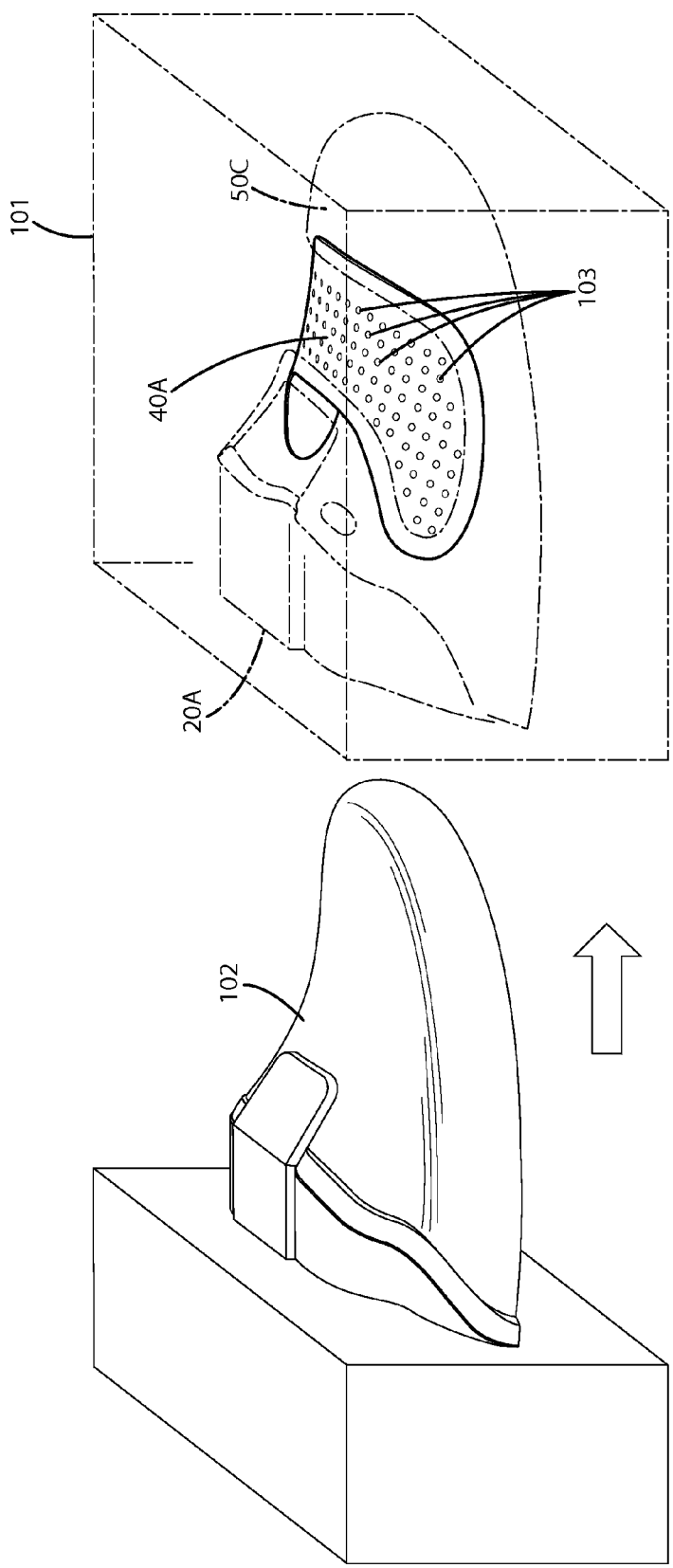
FIG. 5 is a side perspective view of a forepart upper portion being formed in a first mold.

With respect to the injection molding operations, as shown in FIG. 5, the forepart upper portion 20A is molded in a first mold 101. To perform the molding, a first piece 40A of the base material is positioned in a mold cavity 50C. Within the mold 101, a vacuum structure 103 is disposed. This vacuum structure 103 pulls the fabric 40A against the interior of the mold conforming it from a generally two-dimensional shape to a three-dimensional shape. Optionally, this conforming can be performed entirely in the mold, optionally without previously heat setting, molding or conforming the piece 40A. Optionally this can reduce the amount of energy required to construct the upper and its components as well as the amount of time and labor input.

With the base material piece 40A inserted in the mold 101, a second mold 102 is brought into proximity to the first mold 101 to establish a cavity 50C between the second mold 102 and the first mold 101. This cavity 50C generally forms to the three-dimensional features of the exoskeleton 50 of the forepart upper portion 20A. With the first mold 101 and second mold engaged to define the cavity 50C, a first polymeric material, such as any of the exoskeleton materials noted herein, for example, liquid silicone rubber, is injected into the cavity 50C until the cavity is filled and the exoskeleton 50 is formed. The pressure is retained in the mold for a preselected amount of time, during which the polymeric material can cure. As polymeric material is injected, the exoskeleton 50 can take its shape, and can form the various components.

As shown in FIG. 4, the material making up the exoskeleton 50 can bond to and embed itself within the base material 40 and in particular, the edges 41, of the base material piece 40A. Of course, in certain circumstances, the polymeric material can embed beyond the upper surface 45, and in certain cases, can bleed through to the opposite lower surface 43 of the piece 40A, if desired. Further, as the polymeric material is injected to form the exoskeleton 50, the holes 51 and corresponding aesthetic regions 52 of the upper 20 are formed, where the polymeric material generally does not contact and/or bond to the base material 40 and the respective base piece 40A.

During the forming of the exoskeleton, the first polymeric material embeds within and bonds to the base material pieces, for example, to the edges 41 of the piece 40A. After the polymeric material cures, the exoskeleton generally holds the piece 40A in the three dimensional, contoured shape. The exoskeleton 50 generally retains and holds the base material and any respective pieces in the three-dimensional contours in the finished footwear. Over time, of course, the pieces can flex, and generally take on the three-dimensional contoured shape due to being held in that shape for an extended period of time.

Figure 6:
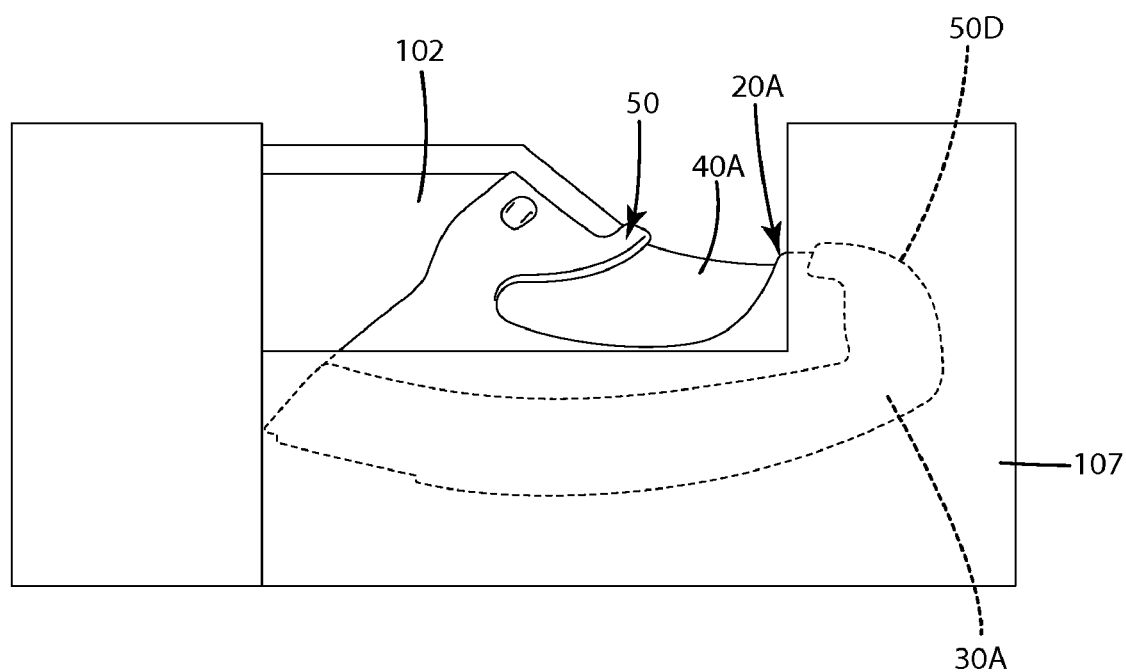
FIG. 6 is a perspective view of a forepart upper portion being joined with a forepart sole portion in a second mold.

After the exoskeleton 50 is sufficiently cooled and formed, the molds 101 and 102 are opened, with the forepart upper portion 20A being formed. The forepart upper portion 20A can remain on the mold 102. The mold 102 can be engaged with third mold 107 as shown in FIG. 6. There, a forepart sole portion 30A can be injection molded into the molds 107 and bond to or generally otherwise be joined with the forepart upper portion 20A. In particular, the mold can inject a second polymeric material into the mold cavity 50D. That second polymeric material can bond directly to the lower portion of the forepart upper portion 20A. The second polymeric material can have different properties from the first polymeric material of the exoskeleton 50. For example, it can be of a different density, durometer, wear resistance, color, shade, hue, chemical resistance, and/or thickness or a combination of the foregoing and the like. Generally, if it is desired that the sole 30 has a greater wear resistance, and is more rigid and less flexible than the upper 20, the second polymeric material used to construct the sole 30 can be of a greater durometer, and can be more dense and more wear resistant than the first polymeric material used to construct the exoskeleton of the upper 20.

After the forepart sole portion 30A is joined with the forepart upper portion 20A, the modular combined forepart 71 is completed.

Optionally, the upper portion 20A and sole portion 30A can be joined with one another using processes other than injection molding. For example, the forepart sole portion 30A can be pour-molded, glued, stitched, cemented, or joined with fasteners to the upper portion 20A. These same techniques can be further optionally used to join the rearpart sole portion 30B with the rearpart upper portion 20B described below.

Figure 7:
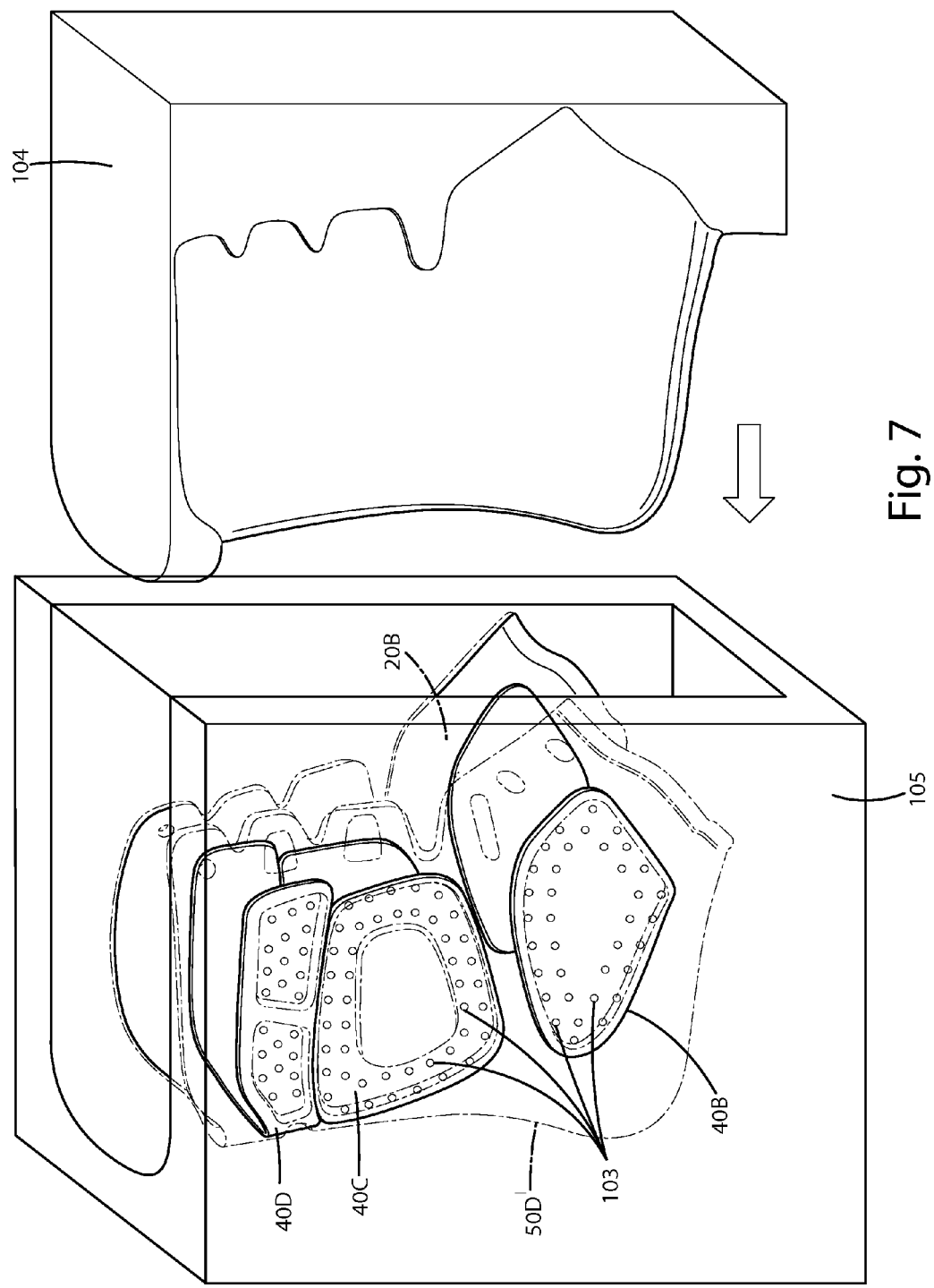
FIG. 7 is a perspective view of a rear part upper portion being formed in a third mold.
Figure 8:
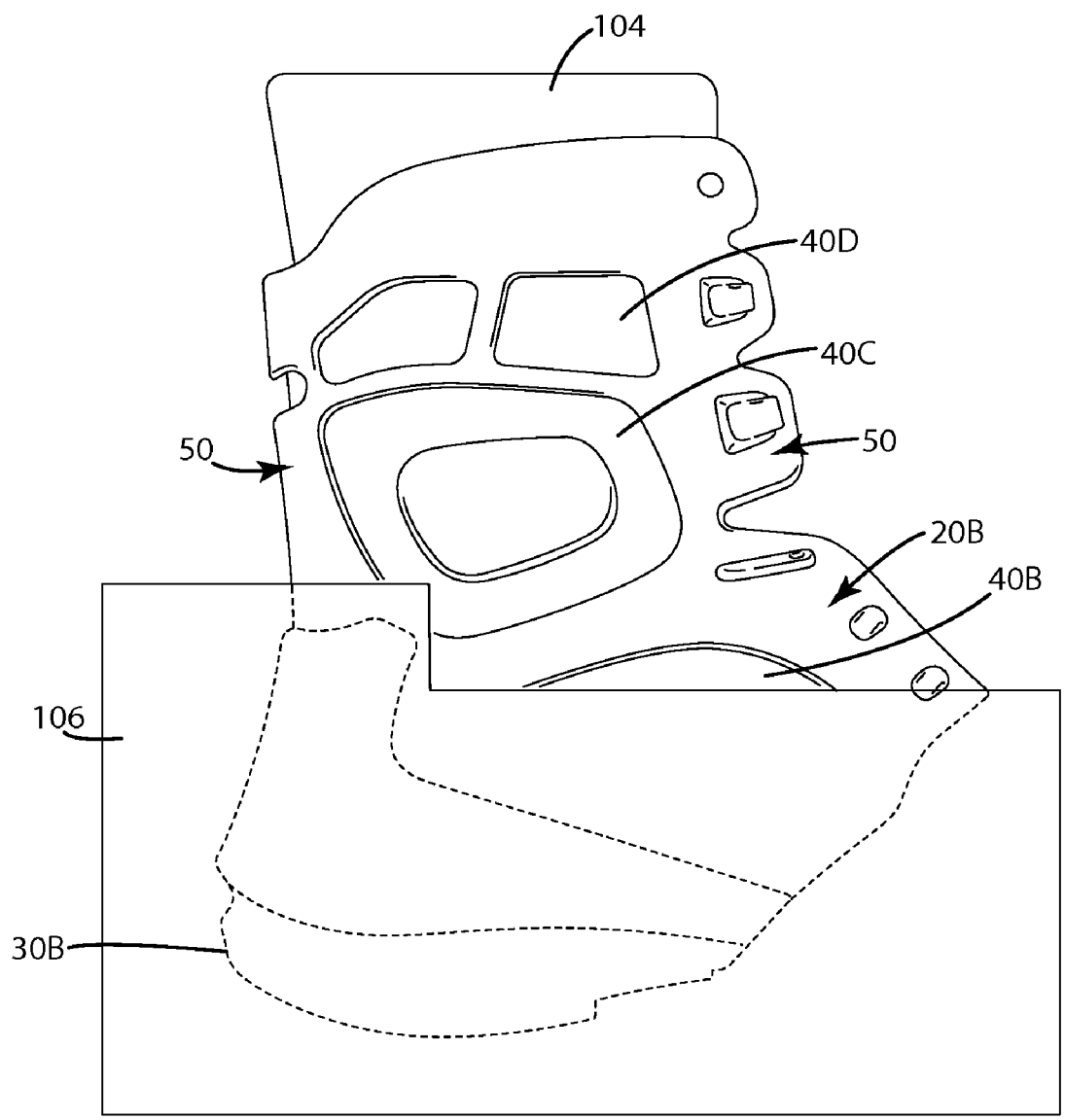
FIG. 8 is a perspective view of the rearpart upper portion being joined with a rearpart sole portion in a fourth mold.
Figure 9:
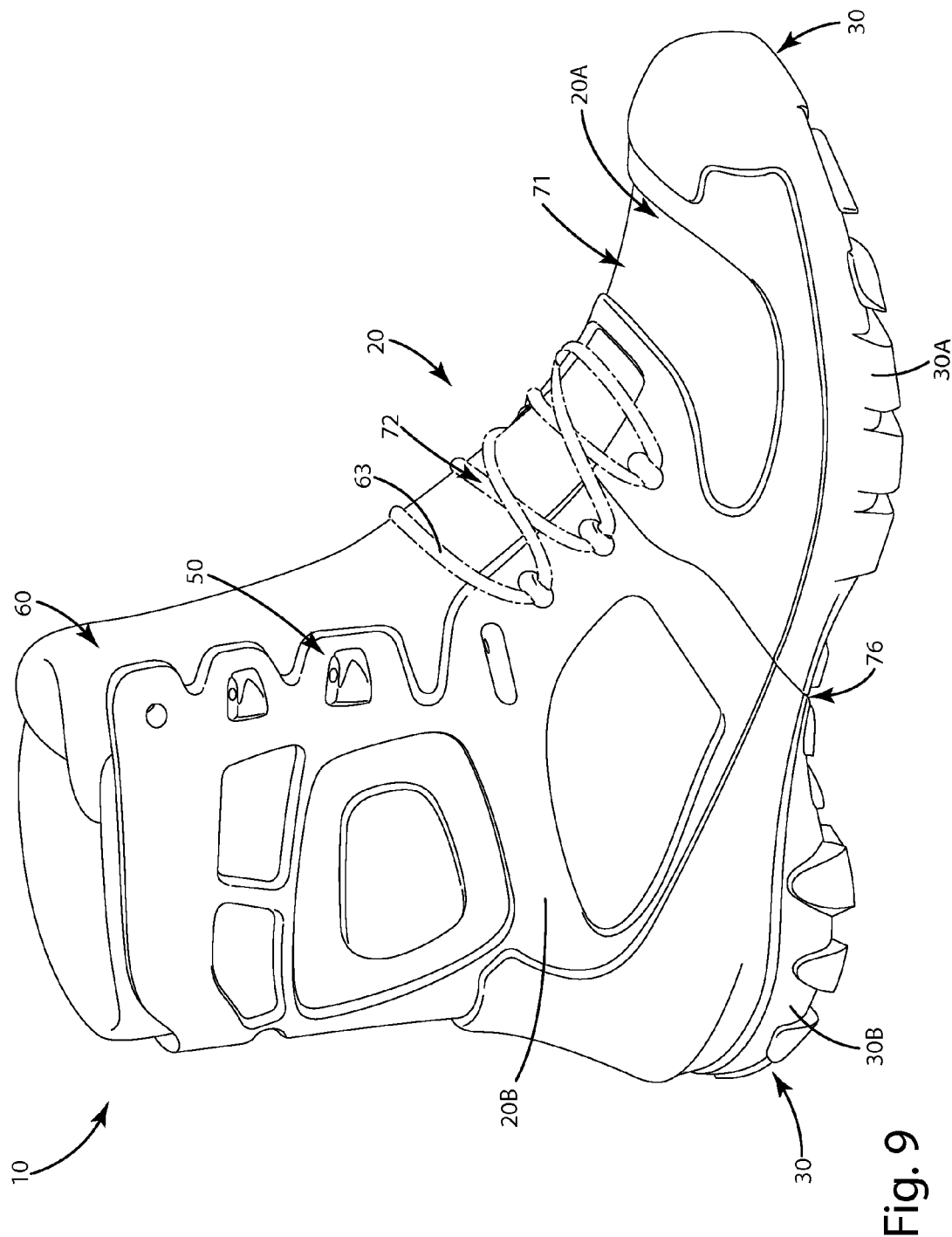
FIG. 9 is a perspective view of the combined forepart and combined rearpart joined to form a size of footwear including a bootie.
Figure 10:
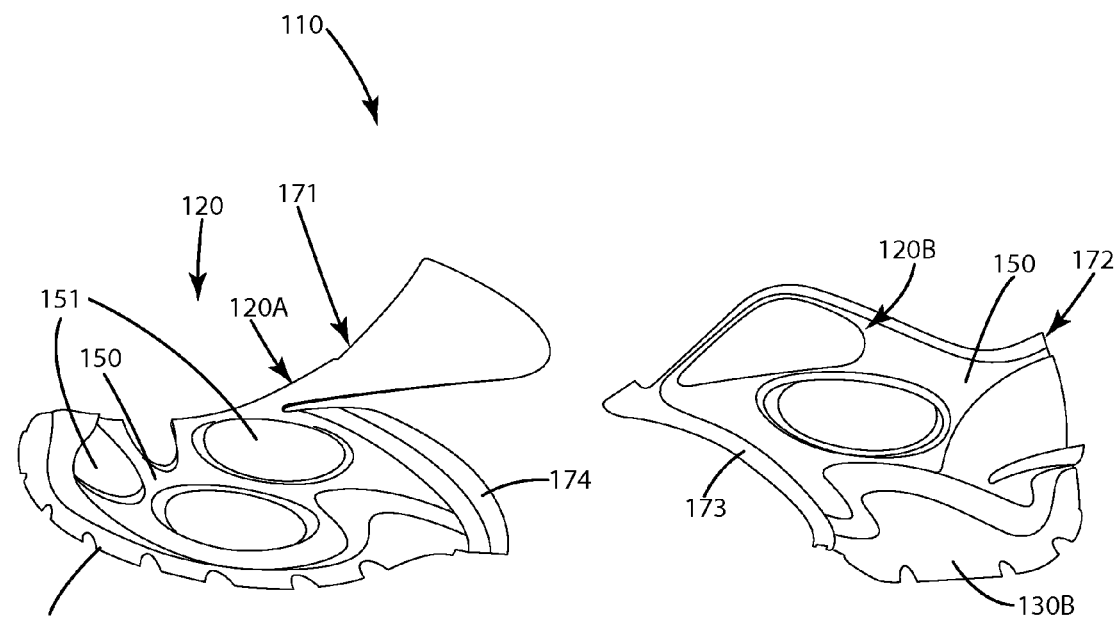
FIG. 10 is a side view of a first alternative embodiment of the footwear including a forepart and a rearpart.

Turning to FIGS. 7 and 8, the modular combined rearpart 72 of the footwear is constructed in a manner similar to that of the modular combined forepart 71, with a few exceptions. For example, as shown in FIG. 7, a fourth mold 105 is provided. The fourth mold 105 includes a cavity that corresponds to the rearpart upper portion 20B of the footwear. One or more pieces of the base material 40, for example, 40B-D can be positioned in the mold cavity 50D' using a vacuum similar to that of the first mold 101 as mentioned above. Of course with this or the other mold, the vacuum can be replaced with a spray-on adhesive, a clamping mechanism, or a close tolerance recess or other devices to hold the base pieces in a desired location within the molds.

With the pieces 40B-40D in place, a fifth mold 104 is positioned proximal the fourth mold 105 so that the exoskeleton cavity 50D is formed. The first polymeric material is injected into the cavity to form the rearpart upper portion 20B using the same techniques and parameters as mentioned above in connection with the molding of the modular combined forepart. After the upper portion 20B is formed with the exoskeleton and the base material pieces, it can be moved on the fifth mold 104, which can be placed proximal to a sixth mold 106. Within the fifth and sixth molds, the rearpart sole portion 30B can be joined with the rearpart upper portion 20B using the same techniques and parameters mentioned above in connection with the forepart 71.

After the modular combined forepart 71 and modular combined rearpart 72 are constructed, these elements can be further manufactured by assembling them. For example, referring to FIG. 3, the modular combined forepart 71 and the modular combined rearpart 72 include respective primary margin 73 and overlap margin 74. The overlap margin 74 can be overlapped by the primary margin 73 by a first distance D1 or a second distance D2. The specific distance D1 or D2, or some other distance, can be selected based on the desired shoe size. For example, if a full shoe size, such as shoe size 9, is desired, the overlap margin 73 is engaged with the primary margin so that the primary margin 73 overlaps the overlap margin 74 by the distance D1. If a half or partial shoe size is desired, such as a U.S. shoe size 9½, the above process is repeated, except the primary margin 73 overlaps the overlap margin 74 by the distance D2. Depending on the desired shoe size, a human operator or automated controller assembling and joining the modular combined foreparts within the modular combined rearparts of a particular footwear model can select a particular preselected distance D1 or D2. This selection can occur on a shoe-by-shoe basis, or for an entire batch of a particular shoe size for a given footwear model. For example, an operator can select the distance D1 to be the preselected distance to manufacture a batch of U.S. size 9 shoes. After constructing that batch, the operator can select the distance D2 to be the preselected distance to manufacture a second batch of U.S. size 9½ shoes. In this manner, the assembly line can be switched back and forth between making footwear having a first shoe size and footwear having a second shoe size, using the same type of modular foreparts 71 and modular rearparts 72 to provide the different sizes of footwear. With this modularity and half size or other differently sized shoes of a particular footwear model can be manufactured with the same parts and optionally the same molds.

In another step, shown in FIG. 3, the overlap margin 74 and the primary margin 73 are contacted generally at a contact area 79, which again can vary depending on the preselected distance D1 or D2. The overlap margin and the primary margin can be joined at the contact area to permanently and fixedly join the footwear forepart and the footwear rearpart along the joint 76. This joining can be performed by RF welding the components together, and more particularly RF welding the primary margin 73 and the overlap margin 74. As noted above, the joining can occur substantially around the entire girth 77 of the footwear, or in preselected locations of the girth 77 as desired.

With the footwear 10 constructed of the desired shoe size, a bootie 60 can be placed within the cavity defined by the upper 20. Lacing 63 can be laced through respective eyelets or lacelets of the upper. If desired, separately constructed lacelets and eyelets (not shown) can be joined with the exoskeleton or other components of the upper 20 and the lacing 63 can be laced therethrough. Other finishing operations, such as trimming, polishing, and the like can be performed to prepare the footwear for final packaging.

The present manufacturing process can be repeated for different size shoes. For example, as mentioned above, a plurality of virtually identical modular combined forepart portions 71 can be molded. Likewise, a plurality of virtually identical modular combined rearpart portions 72 can be molded. A first group of the plurality of modular combined foreparts 71 and a second group of the modular combined rearparts 72 can be selected. These selected foreparts and rearparts can be overlapped by a first preselected distance, for example, distance D1, and joined to manufacture a first plurality of full sized or first sized shoe sized footwear. In another step, a second or remaining group of the modular combined foreparts 71 and modular combined rearparts 72 can be selected, overlapped by the second distance D2, and joined to form a plurality of half sized or second sized shoe size footwear. Accordingly, two completely different sized shoe size footwear of the same model can be constructed from the same modular combined foreparts 71 and modular combined rearparts 72.

IV. First Alternative Embodiment

A first alternative embodiment of the footwear and related method of manufacture is illustrated in FIGS. 10-13 and generally designated 110. The footwear and method of this embodiment are similar to the above embodiments with several exceptions. For example, the upper 110 can be formed primarily by an exoskeleton and can be void of a base material in which it is embedded or bonded.

In this embodiment, the footwear 110 generally includes a modular combined forepart 171 and modular combined rearpart 172. The modular combined forepart 171 can include a forepart upper portion 120A and a forepart sole portion 130A. The modular rearpart 172 can include a rearpart upper portion 120B and a rearpart sole portion 130B constructed in accordance with any of the embodiments above. The upper portions 120A and 120B can include an exoskeleton 150. This exoskeleton 150 can include one or more holes 151 defined therein. The base material and related pieces described in the embodiments above, can be absent from the upper. In other words, the exoskeleton 150 can generally form a substantial portion of the upper 120 without an additional base material.

Optionally, although not shown, the exoskeleton 150 can be contiguous so that no holes 151 are defined therein. Indeed, this construction of the exoskeleton where the holes 151 are absent can be implemented in any of the embodiments described herein.

Figure 11:
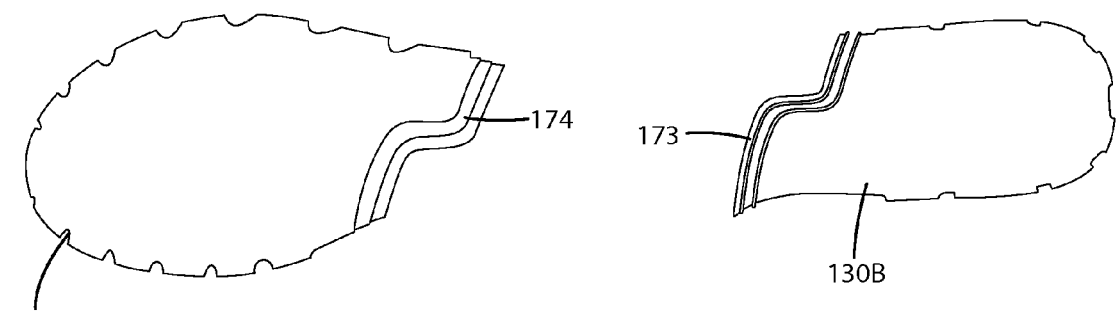
FIG. 11 is a bottom view of the first alternative embodiment of the footwear illustrating sole portions of a forepart and a rearpart.

The footwear 110 can include a respective overlap margin 174 and a primary margin 173. These margins can be overlapped to a preselected distance depending on a desired shoe size. As with the embodiments above, different first and second shoe sizes, for example full and half sizes of a particular footwear can be constructed simply by adjusting the amount of overlap of the overlap margin 174 and the primary margin 173 at the joint of the footwear using the same modular combined forepart 171 and modular combined rearpart 172. FIG. 11 illustrates the overlap margin 174 and primary margin 173 associated with the respective forefoot sole portion 130A and rearpart sole portion 130B.

Figure 12:
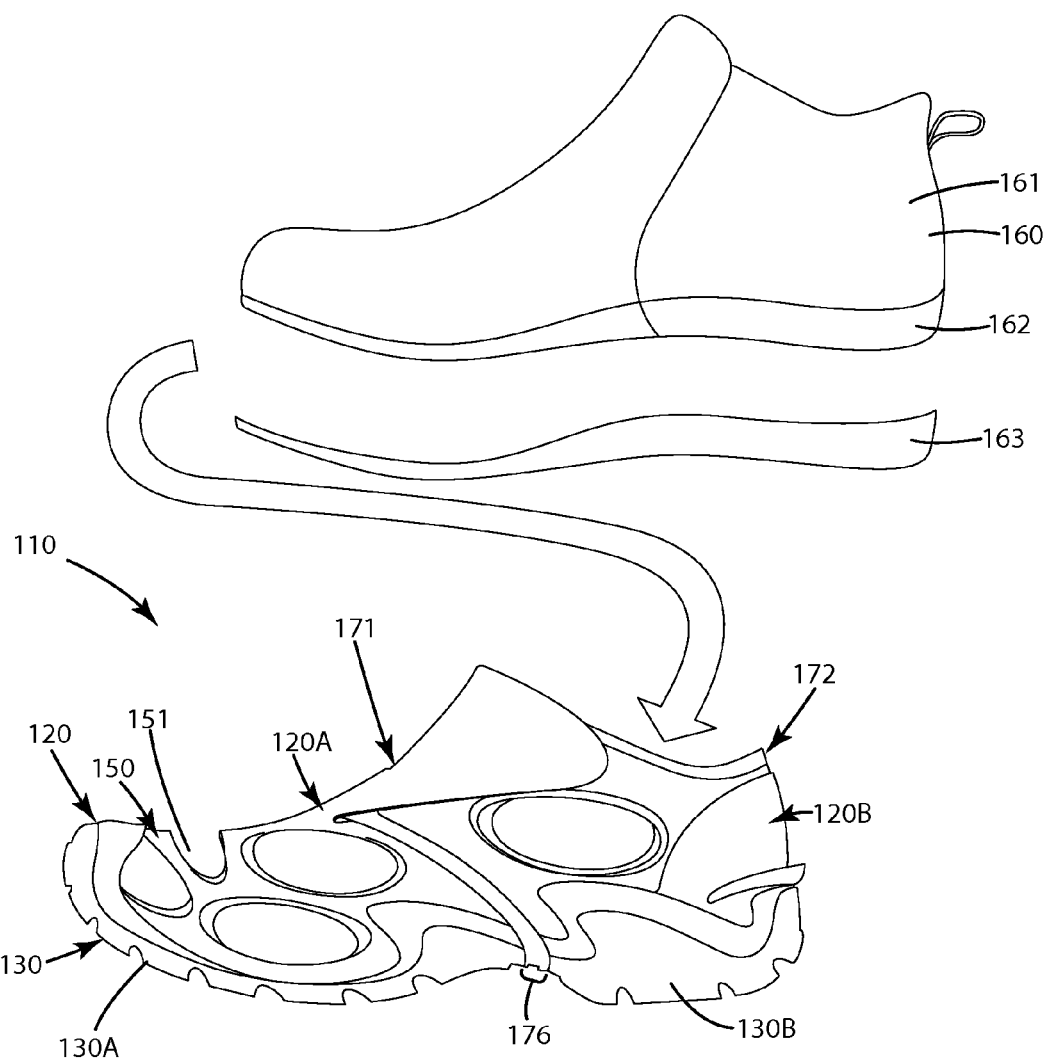
FIG. 12 is a side, partially exploded view of the first alternative embodiment of the footwear illustrating the forepart joined with the rearpart.
Figure 13:
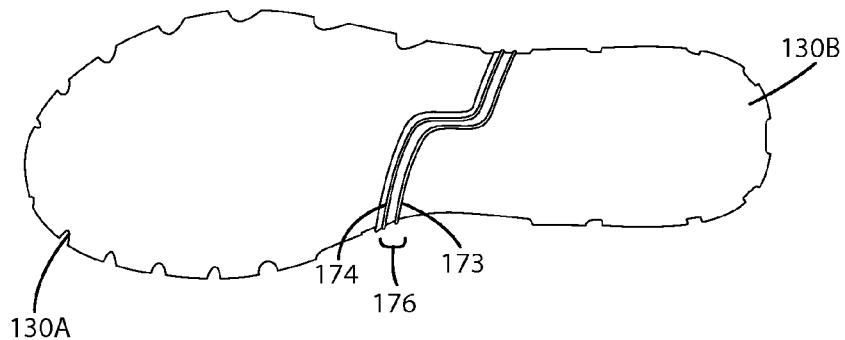
FIG. 13 is a bottom view of the first alternative embodiment of the footwear illustrating the sole portions of the forepart and rearpart joined.

Like the above embodiments, the margins of this footwear 110 can be overlapped, contacted with one another and joined using any of the above joining techniques, including RF welding. FIGS. 12 and 13 illustrate the footwear 110 with the forepart 171 and rearpart 172 joined with one another along a joint 176 at which the overlap margin 174 and primary margin 173 are joined. As with the above construction, when the modular combined forepart 171 is joined with the modular combined rearpart 172, the forepart upper portion 120A joins with the rearpart upper portion 120B to form a combined upper 120. Likewise, the rearpart sole portion 130B joins with the forepart sole portion 130A to form a combined sole 130. Of course, as with any of the other embodiments herein, there may be voids or holes in or between the respective forepart portions and rearpart portions, yet when the two are taken as a whole, they are considered the combined upper 120 and/or combined sole 130.

With reference to FIG. 12, a bootie 160 including an upper portion 161 with a lower sock liner portion 162 stitched thereto can be provided in the footwear 110. This bootie can be inserted directly into the inner cavity formed by the upper 120 of the footwear 110. Optionally, a footbed 163 can also be inserted into the cavity as well.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of manufacturing footwear comprising:
    injection molding a first polymeric material on a first base material to form a first exoskeleton part, the first exoskeleton part holding the first base material in a three-dimensional configuration, thereby substantially preventing the first base material from returning to a substantially two-dimensional configuration,
    injection molding a second polymeric material to form a second exoskeleton part separate from the first exoskeleton part;
    providing a footwear forepart and a footwear rearpart, at least one of the footwear forepart and footwear rearpart including a primary margin, the other of the footwear forepart and footwear rearpart including an overlap margin, the overlap margin adapted to be overlapped by the primary margin by at least one of first distance corresponding to a first shoe size and a second distance corresponding to a second shoe size different from the first shoe size, the footwear forepart including at least one of the first exoskeleton part and the second exoskeleton part, the footwear rearpart including the other of the at least one of the first exoskeleton part and the second exoskeleton part;
    selecting either the first shoe size or the second shoe size to be the size of the footwear;
    aligning the footwear forepart and the footwear rearpart adjacent one another;

overlapping the overlap margin and the primary margin by either the first distance or the second distance based on said selecting step;

contacting the overlap margin with the primary margin at a contact area; and joining the overlap margin with the primary margin at the contact area to permanently and fixedly join the footwear forepart and the footwear rearpart along a joint, wherein at least one of the first exoskeleton part and the second exoskeleton part includes the primary margin and the other of the at least one of the first exoskeleton part and the second exoskeleton part includes the overlap margin, whereby an operator can switch back and forth between making footwear having the first shoe size and footwear having the second shoe size using the same type of footwear foreparts and footwear rearparts to provide the different sizes of the footwear.

2. The method of claim 1 wherein the footwear forepart includes a forepart upper portion joined with a forepart sole portion to form a modular combined forepart, and wherein the rearpart includes a rearpart upper joined with a rearpart sole portion to form a modular combined rearpart.

3. The method of claim 2 wherein said joining includes RF welding the primary margin to the overlap margin.

4. The method of claim 1 wherein the first exoskeleton part is embedded in the footwear forepart and includes the overlap margin.

5. The method of claim 1 comprising injection molding the first exoskeleton part in a first mold and injection molding the second exoskeleton part in a second mold separate from the first mold.

6. The method of claim 1 wherein the first base material and first exoskeleton part form a forepart upper portion, comprising injection molding a third polymeric material so that the third polymeric material joins with at least one of the first exoskeleton part and the first base material, the third polymeric material forming a forepart sole portion, wherein the forepart upper portion and the forepart sole portion form a modular combined forepart portion.

7. The method of claim 6 comprising injection molding a modular combined rearpart portion including a rearpart upper portion and a rearpart sole portion, and joining the modular combined rearpart with the modular combined forepart.

8. The method of claim 1 wherein the second exoskeleton part forms a rearpart upper portion, comprising injection molding a third polymeric material so that the third polymeric material joins with the second exoskeleton part and forms a rearpart sole portion, wherein the rearpart upper portion and the rearpart sole portion form a modular combined rearpart.

9. The method of claim 8 comprising injection molding a modular combined forepart portion including a forepart upper portion and a forepart sole portion, and joining the modular combined forepart with the modular combined rearpart.

10. The method of claim 1 comprising:

injection molding in a first mold the footwear forepart;

injection molding in a second mold the footwear rearpart; and

RF welding the overlap margin and primary margin together at the joint to form a combined upper and a combined sole.

11. A method of manufacturing footwear comprising:

placing a sheet of material, having an upper surface and a lower surface, in a mold;

injection molding a first polymeric material at a mold pressure in the mold so that the first polymeric material bonds to and at least partially embeds in the sheet, the first polymeric material forming a structural first exoskeleton part that at least partially retains the sheet in a contoured, three-dimensional form, the first exoskeleton part and the sheet forming at least one of a footwear forepart upper portion and a footwear rearpart upper portion;

injection molding a second polymeric material in another mold to form a structural second exoskeleton part separately from the first exoskeleton part, the second exoskeleton part forming the other of the at least one of a footwear forepart upper portion and a footwear rearpart upper portion;

aligning the footwear forepart upper portion and the footwear rearpart upper portion, at least one of the footwear forepart upper portion and footwear rearpart upper portion including a primary margin, the other of the at least one of the footwear forepart and footwear rearpart including an overlap margin, the overlap margin adapted to overlap the primary margin by at least one of first distance corresponding to a first shoe size and a second distance corresponding to a second shoe size, the second shoe size different from the first shoe size;

overlapping the overlap margin and the primary margin by either the first distance or the second distance; and joining the overlap margin and the primary margin to permanently and fixedly join the footwear forepart upper portion and the footwear rearpart upper portion, whereby the footwear after joining is of either the first shoe size or of the second shoe size, wherein at least one of the first exoskeleton part and the second exoskeleton part includes the primary margin and the other of the at least one of the first exoskeleton part and the second exoskeleton part includes the overlap margin.

12. The method of claim 11 comprising injection molding the first exoskeleton part so the first exoskeleton part defines at least one hole through which the upper surface of the sheet is visible and forms an aesthetic region.

13. The method of claim 11 comprising injection molding at least one of a footwear forepart sole portion so it joins the footwear forepart upper portion, and a footwear rearpart sole portion so it joins the footwear rearpart upper portion.

14. The method of claim 11 comprising establishing a vacuum to hold the sheet in the mold.

15. The method of claim 11 wherein said joining includes RF welding the primary margin and the overlap margin together.

16. A method of manufacturing footwear including a forefoot region, an arch region and a heel region, the method comprising:

injection molding at least one of a forepart upper portion and a rearpart upper portion, at least one of the forepart upper portion and rearpart upper portion including a primary margin, the other of the at least one of the forepart and rearpart including an overlap margin, at least one of the forepart upper portion and rearpart upper portion including a base material bonded to a first exoskeleton part, the other of the at least one of the forepart upper portion and rearpart upper portion including a separately formed second exoskeleton part, at least one of the first exoskeleton part and the second exoskeleton part including the primary margin, and the other of the at least one of the first exoskeleton part and the second exoskeleton part including the overlap margin;

overlapping the overlap margin and the primary margin a preselected distance, the preselected distance corresponding to a first shoe size or a second shoe size different from the first shoe size;

joining a forepart sole to the forepart upper portion and joining a rearpart sole to the rearpart upper portion before said overlapping step, the forepart sole and rearpart sole being separate and independent structures before said overlapping step; and joining the overlap margin and the primary margin to permanently and fixedly join the forepart upper portion and the rearpart upper portion, whereby a combined upper is formed, the combined upper being of either the first shoe size or the second shoe size.

17. The method of claim 16 wherein the forepart upper portion extends within at least one of a forefoot region and an arch region, wherein the rearpart upper portion extends within at least one of a heel region and the arch region.

18. The method of claim 17 wherein the forepart sole and rearpart sole are separate and independent structures before said overlapping step.

19. The method of claim 16 wherein at least one of the forepart upper portion and rearpart upper portion includes the first exoskeleton part, which is bonded to and at least partially embedded in the base material respectively during said injection molding step, wherein the forepart upper portion is injection molded in a first mold and wherein the rearpart upper portion is molded in a second mold that is separate and different from the first mold.

20. The method of claim 16 wherein the first shoe size corresponds to a half shoe size and the second shoe size corresponds to a full shoe size, wherein the preselected distance corresponds to at least one of the half shoe size and the full shoe size.

21. A footwear construction, including a forefoot region, an arch region and a heel region, comprising:

a forepart upper portion joined with a forepart sole portion to form a combined forepart, the combined forepart adapted to extend in at least one of a forefoot region and an arch region of the footwear;

a rearpart upper portion joined with a rearpart sole portion to form a combined rearpart, the combined rearpart adapted to extend in at least one of a heel region and the arch region of the footwear, the combined rearpart and the combined forepart being separate and independent components before the footwear is assembled;

a primary margin included in at least one of the combined forepart and the combined rearpart;

an overlap portion included in the other of the at least one of the combined forepart and the combined rearpart, an exoskeleton injection molded to a base material so that the base material is visible through an opening defined in the exoskeleton, the exoskeleton forming the primary margin and the overlap portion in the respective at least one of the combined forepart and the combined rearpart, wherein the overlap margin and the primary margin are overlapped a preselected distance, the preselected distance corresponding to a first shoe size or a second shoe size different from the first shoe size, wherein the overlap margin and the primary margin are permanently and fixedly joined along a joint, wherein the combined forepart and combined rearpart are joined with one another along the joint, wherein the forepart upper portion and the rearpart upper portion form a combined upper, wherein the forepart sole portion and the rearpart sole portion form a combined sole, whereby the extent of the overlap by the preselected distance dictates the shoe size of the footwear.

22. The footwear construction of claim 21 wherein the joint extends substantially around a girth of the footwear, substantially across the combined upper and the combined sole.

23. The footwear construction of claim 21 wherein the overlap margin and the primary margin are permanently and fixedly joined along the joint by an RF weld.

24. The footwear construction of claim 21 wherein the combined upper includes the exoskeleton which is bonded to and at least partially embedded in the base material.

* * * * *